United States Patent
Seshadri et al.

(10) Patent No.: US 6,615,201 B1
(45) Date of Patent: Sep. 2, 2003

(54) COMPUTER NETWORK MANAGEMENT

(75) Inventors: Srinivasan Seshadri, Basking Ridge, NJ (US); Abraham Silberschatz, Warren, NJ (US)

(73) Assignee: Lucent Technologies, Murray Hill, NJ (US)

( * ) Notice: Subject to any disclaimer, the term of this patent is extended or adjusted under 35 U.S.C. 154(b) by 0 days.

(21) Appl. No.: 09/558,425

(22) Filed: Apr. 25, 2000

(51) Int. Cl.[7] .......................... G06F 17/30; G06F 15/16; G06F 15/173
(52) U.S. Cl. .......................... 707/2; 709/200; 709/223; 709/224; 707/3; 707/4
(58) Field of Search .............................. 707/1–6, 9–10, 707/500, 500.1, 501.1, 513; 709/200–203, 217, 220, 223–225

(56) References Cited

U.S. PATENT DOCUMENTS

| | | | | |
|---|---|---|---|---|
| 5,678,006 A | * | 10/1997 | Valizadeh et al. | 709/223 |
| 5,954,797 A | * | 9/1999 | Sidey | 709/223 |
| 5,959,985 A | * | 9/1999 | Freen et al. | 370/351 |
| 6,236,996 B1 | * | 5/2001 | Bapat et al. | 707/9 |
| 6,377,993 B1 | * | 4/2002 | Brandt et al. | 709/227 |

* cited by examiner

Primary Examiner—Alford Kindred

(57) ABSTRACT

A computer network management arrangement employs enhanced network elements that include database technology. This, in turn, allows such enhanced network elements to filter management information intelligently and also to notify an associated network manager of the occurrence of complex events of interest. More specifically, the network elements are enhanced through use of database technology to process declarative queries and to support triggers. Additionally, auxiliary network managers, that perform as proxies for network elements that have not been enhance with database technology, are employed to collect and integrate management information from one or more non-enhanced network elements. Consequently, the management information supplied to a network manager from the auxiliary network mangers could be significantly less than that collected from the network elements. Thus, the auxiliary network managers further reduce the network management traffic. In a specific embodiment of the invention, support is embedded into the individual network elements for a declarative query language, one example being the structured query language (SQL). Support is also added for event notification to the individual network elements. One or more auxiliary network managers are employed that can answer declarative inquiries. Moreover, the management information base information stored in the individual network elements is modeled as relational tables that are queried.

18 Claims, 4 Drawing Sheets

100

TABLE A

| [interfaces.ifNumber] (snmp_agent, value): ||
|---|---|
| snmp_agent | value |
| 135.104.46.1 | 26 |
| 135.104.46.2 | 3 |
| 135.104.46.3 | 2 |
| 135.104.46.4 | 1 |
| ⋮ | |

FIG. 6

TABLE B

| [interfaces.ifTable] (snmp_agent, ifIndex, ifDescr, ifType,..., ifSpecific): ||||
|---|---|---|---|
| snmp_agent | ifIndex | ifDescr | ... |
| 135.104.46.1 | 1 | Hssi1/0 | ... |
| 135.104.46.1 | 2 | FastEthernet2/0/0 | ... |
| 135.104.46.1 | 3 | Ethernet5/0/0 | ... |
| ⋮ | | | |
| 135.104.46.1 | 26 | Loopback0 | ... |
| 135.104.46.2 | 1 | lo0 | ... |
| 135.104.46.2 | 2 | hme0 | ... |
| 135.104.46.2 | 3 | hme1 | ... |
| 135.104.46.3 | 1 | lo0 | ... |
| 135.104.46.3 | 2 | hme0 | ... |
| 135.104.46.4 | 1 | HP ETHERNET MULTI-ENVIRONMENT,RO | ... |
| ⋮ | | | |

COMPUTER NETWORK MANAGEMENT

TECHNICAL FIELD

This invention relates to computer networks and, more particularly, to the management of computer networks.

BACKGROUND OF THE INVENTION

Because of the explosion in the complexity of computer networks, computer network management has become critical. Network management is required to perform fault diagnosis, performance management, predict loads, plan for future traffic and the like. Indeed, automated tools for computer network management on such large-scale complex and heterogeneous networks are crucial to ensure that the networks remain healthy and available.

Known network management tools and methodologies are presently not capable of filtering information intelligently at the individual network elements. Furthermore, there is little support for event notification, which results in excessive network management traffic.

The present dominant standard for network management is the "Simple Network Management Protocol" (SNMP). SNMP and other known network management methodologies suffer from a number of deficiencies including the following:

- Generate a High Volume of Management Traffic: The SNMP protocol supports retrieval of single objects stored at network elements but does not allow any sort of computation to be performed at the individual network elements. As a result, large volumes of data may need to be transferred to a network manager (station at which network management is being performed) and the network manager may filter most of the retrieved data.
- No Support for Event Notification: Although there is primitive support for event notification in the form of traps in SNMP, it is not sufficiently expressive. Therefore, network management using SNMP is predominantly polling based, which results in the familiar problems of either missing an event (if the polling interval is long) or incurring a large overhead (if the polling interval is short). To perform effective and efficient network management, support for complex event detection and notification is required. For example, a network manager may want to be notified when the average error rate on all the interfaces of a switch exceeds ten percent.
- Centralized processing: Network management has traditionally been performed in a centralized fashion primarily to ensure that the impact of adding network management to managed nodes is minimal. However, the central network manager could become a bottleneck as the network complexity increases.

SUMMARY OF THE INVENTION

Problems and limitations of prior known computer network management arrangements are addressed by incorporating database technology into individual network elements of the computer network. This, in turn, allows such enhanced network elements to filter management information intelligently and also to notify an associated network manager of the occurrence of complex events of interest. More specifically, the network elements are enhanced through use of database technology to process declarative queries and to support triggers.

Additionally, one or more auxiliary network managers, that perform as proxies for network elements that have not been enhanced with database technology, are employed to collect and integrate management information from one or more non-enhanced network elements. Consequently, the management information supplied to a network manager from the auxiliary network mangers could be significantly less than that collected from the network elements. Thus, the auxiliary network managers further reduce the network management traffic.

In a specific embodiment of the invention, support is embedded into the individual network elements for a declarative query language, one example being the structured query language (SQL). Support is also added for event notification to the individual network elements. One or more auxiliary network managers are employed that can answer declarative inquiries. Moreover, the management information base information stored in the individual network elements is modeled as relational tables that are queried.

BRIEF DESCRIPTION OF THE DRAWING

FIG. 6 graphically illustrates another base table also useful in describing an embodiment of the invention.

DETAILED DESCRIPTION

Figure 1:
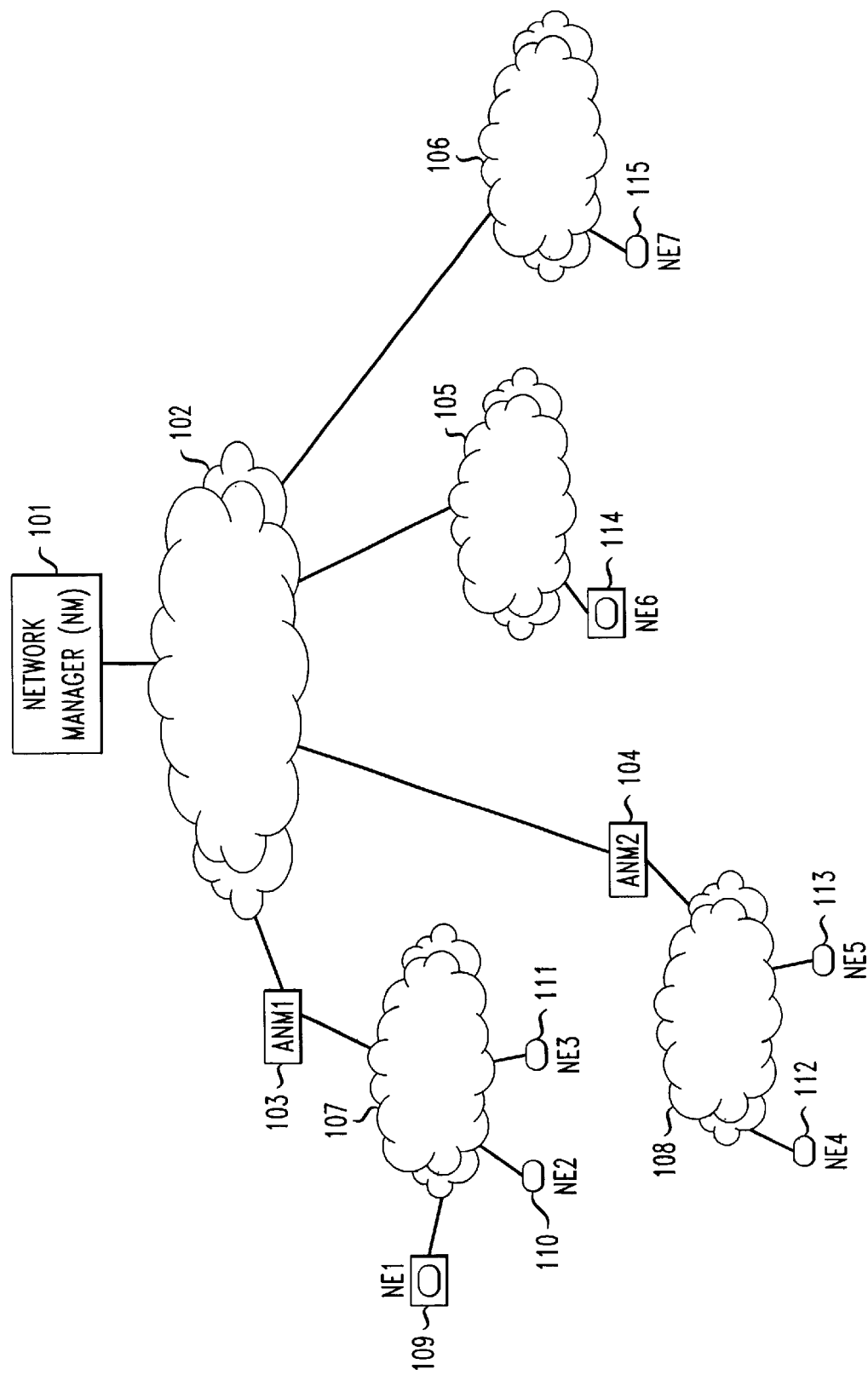
FIG. 1 shows, in simplified block diagram for, details of a network in which an embodiment may be advantageously employed.

FIG. 1 shows, in simplified block diagram for, details of a network in which an embodiment may be advantageously employed. Specifically, shown is network manager (NM) 101 that is a computer station at which network management is performed. NM 101 communicates via a communications medium 102 to, for example, auxiliary network manager (ANM) 103, ANM 104, sub-network 105 and sub-network 106. Communications medium 102 may be a local area network (LAN), wide area network (WAN), wireless link, telephone link, or the like. ANM 103 communicates, in this example, via sub-network 107 with network elements 109, 110 and 111. In this example, network element 109 is an enhanced network element that is described below. Network elements 110 and 111 are ordinary network elements including typical network element modules. Similarly, ANM 104 communicates via sub-network 108 with ordinary network elements 112 and 113. Sub-network 105 communicates with enhanced network element (ENE) 114 and sub-network 106 communicates with ordinary network element 115. It is noted that in this example, queries are supplied in a Structured Query Language (SQL).

It should be noted that a simple network management protocol (SNMP) has emerged as the current standard for network management in the internet. SNMP has two important components:

The notion of a Management Information Base (MIB) that is essentially a schema for storing data objects related to the activity of a network element. The schema is essentially a hierarchical database in that the entire data is organized as a tree.

A standard protocol for retrieving information stored in the MIBs. This standard allows network management processes to retrieve specific objects (using snmpget) in the MIB or to retrieve an entire subtree (using snmpwalk) rooted at a node.

Figure 2:
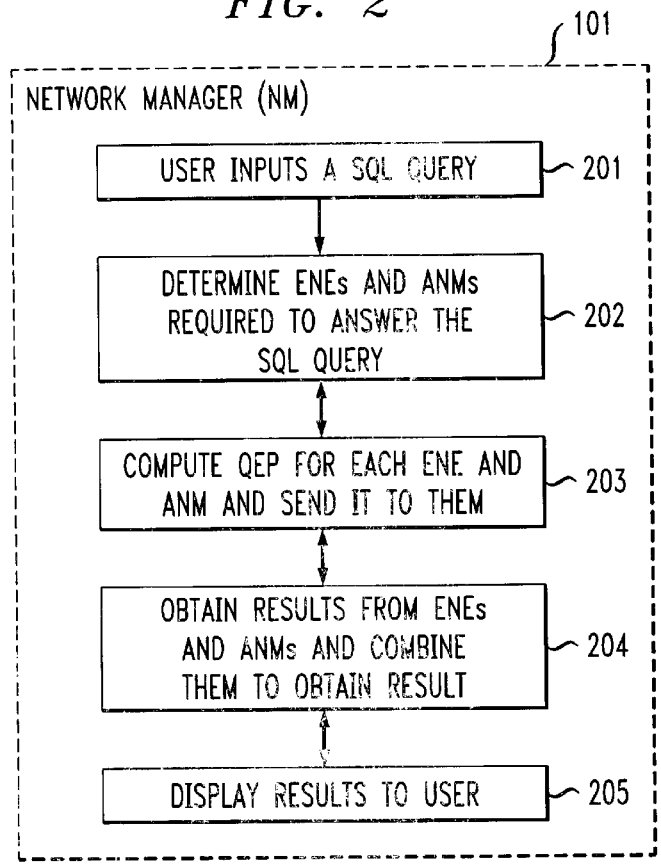
FIG. 2 illustrates a flow diagram showing steps in the query process employed in the network manager of FIG. 1.

FIG. 2 illustrates a flow diagram showing steps in the query process employed in the network manager 101 of FIG. 1. Typically, network manager 101 includes the following modules: a query receiver, a query parser, a query optimizer, a query execution plan (QEP) generator and a query execution engine (called evaluator in the implementation). In this example, in step 201 a user inputs a Structured Query Language (SGL) query that is received by the query receiver. Usually the SQL query will be parsed by the parser. That is, the query parser is typically a process that analyzes a statement, e.g., the query, and resolves it into a form that can be understood by network manager 101. In this example, the query parser is a SQL parser. Such parsers are known in the art. It is further noted that the query parser does not have schema meta-data, so it infers the schema of involved tables from the query itself. Another option (which is not employed in this example) is to make the parser MIB-knowledgeable, so that it can identify schema problems early, before query execution is actually carried out.

Then, step 202 causes NM 101 to determine the enhanced network elements (ENEs) and/or auxiliary network managers (ANMs) required to answer the supplied SQL query. It is noted that there may be a set on such ENEs including zero, one or more enhanced network elements and/or a set of ANMs including zero, one or more auxiliary network manager units. Thereafter, step 203 causes a query execution plan (QEP) to be computed, i.e., determined, for each of the determined ENEs and ANMs and, thereafter, sends, i.e., transmits, the QEPs to the determined associated ENEs and ANMs. Usually, this is realized by a query optimizer that takes in the supplied SQL query and outputs the needed Query Execution Plans (QEPs). One such example follows: public class QueryOptimize

```
{
    public static RAE optimize(SQLQuery query) throws
    CannotOptimizeException ...
}
```

A QEP is basically a relational algebraic tree (RAE), with the addition of two types of nodes: snmp_union and snmp_singleton. They both can have only one child. An snmp_union signals that its child should be sent to all ANMS, and the union of the returning results taken; while an snmp_agent means that its child needs only be sent to a single ANM.

Since the optimizer doesn't have statistical information about base tables (which are virtual and not materialized), it basically just pushes selection and projections down the algebraic tree, while bringing snmp_union and snmp_singleton nodes up the algebraic tree. It can also identify common subtrees. This optimization not only reduces computing strength of the query, but also reduces network traffic used to ship partial results back and forth between NM 101 and ANMs 103 and 104, and between ANMs 103 and 104.

A query execution engine, i.e., evaluator, is typically employed to execute the QEP and one example is as follows:

```
public class RAEEvaluator
{
    private ANMService creator;           // for NM: null
                                          // for ANM: the ANM itself
    private MultiHashtable anmTable;      // Key - ANMService
                                          // Value - snmp_agent
    private Hashtable snmpAgentTable;     // Key - snmp_agent;
                                          // Value - ANMService for the
                                          //         snmp_agent
    public Relation evaluate(RAE rae, Vector warningMsgVec, StatInfo
        stinfo) throws EvaluationException
}
```

The evaluator is actually composed of two parts, i.e., a relational algebra engine (RAE) and SNMP wrapper. Since accessing SNMP data is potentially much more slower than accessing a true relational database on a local disk, the relational algebra engine should be made as parallel as possible. For example, relations involved in a multi-way join should be evaluated simultaneously, unless the result of evaluating one particular relation limits the number of ANMs to use to evaluate other relations (i.e. there is a join on snmp_agent attribute which shall impose a constraint on the possible values of that attribute-semi-join).

Then, step 204 causes the results to be obtained, i.e., transmitted, from the determined ENEs and ANMs and causes those results to be combined to yield the query result. Step 205 causes NM 101 to display the obtained query result to the user.

Figure 3:
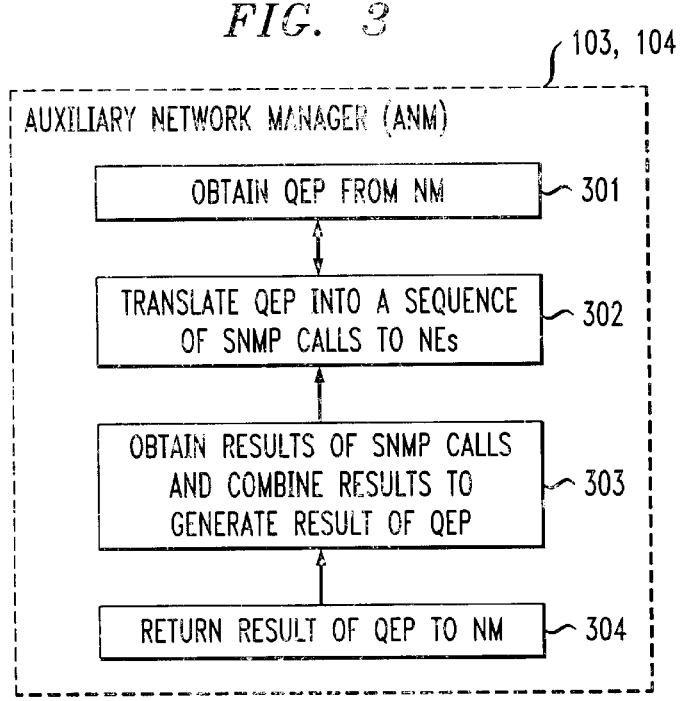
FIG. 3 illustrates a flow diagram showing steps in the query process employed in an auxiliary network manager used in the network of FIG. 1.

FIG. 3 illustrates a flow diagram showing steps in the query process employed in an auxiliary network manager (ANM) 103, 104 employed in the network 100 of FIG. 1.

An ANM 103, 104 typically includes a query execution engine (virtually the same as contained in NM), a SNMP wrapper (embedded in evaluator in the implementation) and a Java remote method invocation (RMI) interface. Specifically, step 301 obtains, i.e., receives, an associate QEP for the ANM 103, 104 from NM 101. Then, step 302 causes the translation of the QEP into a sequence SNMP calls to one or more associated network elements (NEs). In this example, a SNMP wrapper converts SQL queries or relational algebraic expressions into the series of SNMP calls. As is known, relational algebra is a simple language to express queries, such as, SQL queries, to a database. A relational algebra engine accepts relational algebra queries and executes them and returns the result.

The Java RMI interface of an ANM 103, 104 is as follows:

```
public interface ANMService extends java.rmi.Remote
{
public EvaluationResult evaluateRAE(RAE rae, String[ ]snmp_agents)
    throws RemoteException, EvaluationException;
}
/**
*EvaluatiouResult contains the resulting Relation and warning messages.
/*
public class EvaluationResult implements java.io.Serializable
{
    public final Relation result;
    public final Vector warningMsgVec;

// Statistical information.
    public final StatInfo stinfo;
}
/**
*Abstract class to represent a Relational Algebraic Expression.
*/
public abstract class RAE implements java.io.Serializable { }
```

Relational algebraic expression (RAE) is the QEP.

Step 303 obtains results of the SNMP calls to the NEs and combines the obtained results to generate the result of the QEP. Then, step 304 returns the result of the QEP to NM 101.

Figures 4, 5:
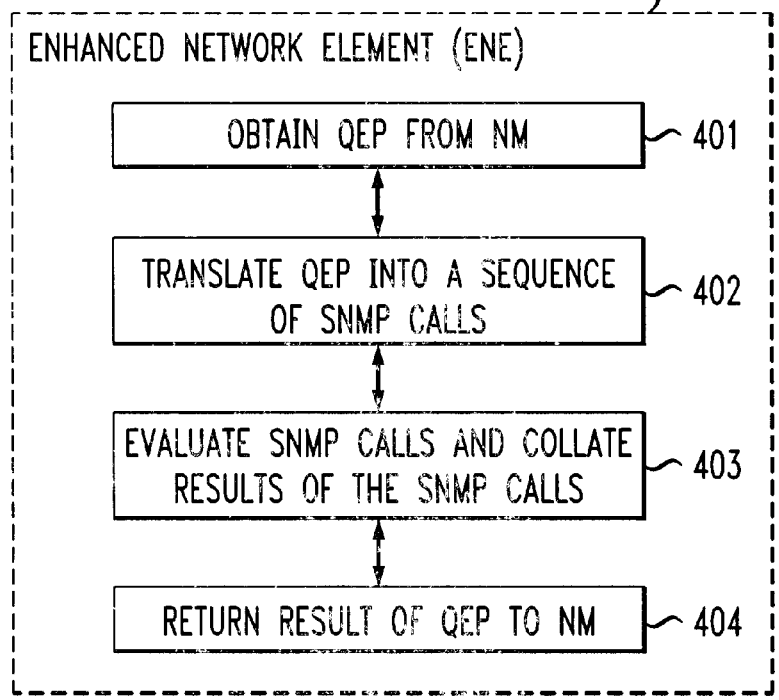
FIG. 4 illustrates a flow diagram showing steps in the query process employed in an enhanced network element utilized in the network of FIG. 1.
FIG. 5 graphically illustrates a base table useful in describing an embodiment of the invention.

FIG. 4 illustrates a flow diagram showing the steps in the query process employed in an enhanced network element (ENE) employed in the network 100 of FIG. 1. As is known, SNMP provides a simple "get" and "set" mechanism to get values of variables and to set them. The variables are defined in a MIB and every network element has an associated MIB. Thus, to retrieve information from a network element a sequence of SNMP calls may be used and, then correlate the results of the calls. It is noted that use of SQL queries makes it significantly easier to realize this for the user. Again, this requires that the SQL query be internally converted to the sequence of SNMP calls. Consequently, the user does not have to write any software code to realize this conversion from SQL to the SNMP calls. An enhanced network element (ENE) 108, 114 typically includes a query execution engine (virtually the same as contained in NM 101 and ANM 103, a SNMP wrapper (embedded in evaluator in the implementation) and a Java remote method invocation (RMI) interface. Specifically, step 401 obtains, i.e., receives, an associated QEP for the NE 108 or 114 from NM 101. Then, step 402 causes the translation of the received QEP into a sequence of SNMP calls for this enhanced network element (ENE). In this example, the SNMP wrapper converts SQL queries or relational algebraic expressions into a series of SNMP requests. The Java RMI interface is essentially identical as that employed in ANM 103, 104 and described above. Step 403 evaluates the SNMP calls and collates the results of the. SNMP calls to obtain the QEP result. Then, in step 404 the QEP result is returned, i.e. supplied or otherwise transmitted, to NM 101.

The following is a relational data model for network management data.

All network management data as viewed by a network management (NM) station 101 (FIG. 1) over a specific network management domain—the set of SNMP agents manageable by the NM 101—are conceptually viewed as a relational database. The schema of the (conceptual) management database is described below.

First, it is felt best to explicitly distinguish four different types of identifiers used in SNMP. An SNMP identifier can be one of the following:

(a) a non-leaf ASN.1 object identifier (i.e., not denoting any type or instance), e.g., interfaces;

(b) an identifier denoting the single instance of a certain non-aggregate object type, e.g., interfaces.ifNumber.0 and interfaces.ifTable.ifEntry.ifType. 1;

(c) a leaf ASN. 1 object identifier denoting a non-aggregate data type, e.g., interfaces.ifNumber (d) an identifier denoting an aggregate type, e.g. interfaces.ifTable, interfaces.ifEntry.

Identifiers of types (a) and (b) do not appear in our schema. Identifiers of type (d) denoting an entry of a table (e.g., interfaces.ifEntry) also does not appear in our schema.

(For simplicity, 0 attributes are of type string in the network 100. Any leaf node in ASN.1 object identifier tree defines a new data type, however it may be just a stereotyped ASN.1 syntax as defined in SMI or a subtype of such a stereotyped syntax.) Single-instance variables are:

For each type-c SNMP identifier <c>, we have the following base table (Table A, FIG. 5):

<c>(snmp_agent, value).

It is a collection of values of <c>. 0 on different SNMP agents, tagged with the IP address of those SNMP agents (snmp_agent attribute). For example, we can have: [interfaces. ifNumber](snmp_agent, value) and we can raise a query at a network management station such as:

| SELECT | ifn.value |
|---|---|
| FROM | [interfaces.ifnumber1] AS ifn |
| WHERE | ifn.snmp_agent = '135.104.46.11'; |

SNMP tables are:

For each type-d SNMP identifier denoting a table <t>, we have the following base table:

<t>(snmp_agent, <cl>, <c2>, . . . ).

It is the union of individual SNMP tables of the SNMP agents in the domain, with the added attribute snmp_agent.

For example, we can have (Table B, FIG. 6): [interfaces.ifTable](snmp_agent, ifIndex, ifDescr, ifType, . . . , ifSpecific), and we can raise a query at a network management station such as:

| SELECT | ift.ifIndex, ift.ifDescr |
|---|---|
| FROM | [interfaces.ifTable] AS ift |
| WHERE | ift.snmp_agent = '135.104.46.1'; |

Example queries are:

Systems information about all agents in the domain.

| SELECT | sysDescr.snmp_agent AS agent, |
|---|---|
| | sysDescr.value AS descr, |
| | sysName.value AS name, |
| | sysLocation.value AS location, |
| | sysUpTime.value AS up_time |
| FROM | [system.sysDescr] AS sysDescr, |
| | [system-sysName] AS sysName, |
| | [system.sysLocation] AS sysLocation, |
| | [system.sysUpTime] AS sysUpTime |
| WHERE | sysDescr.snmp_agent = sysUpTime.snmp_agent AND |
| | sysDescr.snmp_agent = sysName.snmp_agent AND |
| | sysDescr.snmp_agent = sysLocation.snmp_agent; |

Number of interfaces of all agents in the domain.

| SELECT | t.snmp_agent AS agent, |
|---|---|
| | s2.value AS name, |
| | s1.value AS descr, |
| | t_value AS if_num |
| FROM | [interfaces.ifNumber] AS t, |
| | [system.sysDescr] AS s1, |
| | [system.sysName1] AS s2 |
| WHERE | t.snmp_agent = s1.snmp_agent AND |
| | t.snmp_agent = s2.snmp_agent; |

All 100 Mbps interfaces.

| SELECT | ift.snmp_agent AS agent, |
|---|---|
| | sysName.value AS sys_name, |
| | sysLocation.value AS sys_loc, |
| | ift_ifIndex AS if_no, |
| | ift.ifDescr AS descr, |
| | ift.ifType AS type, |
| | ift.ifMtu AS mtu, |
| | ift.ifPhysAddress AS mac_addr |

-continued

| | |
|---|---|
| FROM | [interfaces.ifTable] AS ift, |
| | [system.sysName] AS sysName, |
| | [system.sysLocation] AS sysLocation |
| WHERE | ift.ifSpeed = '100000000', AND |
| | Ift_snmp_agent = sysName.snmp_agent AND |
| | ift.snmp_agent = sysLocation.snmp_agent; |

Find the immediate NEXT HOPS of a given agent.

| | |
|---|---|
| SELECT | iprt.snmp_agent AS [from], |
| | iprt.ipRouteNextHop AS to |
| FROM | [ip.ipRouteTable] AS iprt |
| WHERE | iprt.snmp_agent = '135.104.46.1'); |
| SELECT | iprt-snmp_agent AS [from], |
| | sn_from.value AS [name-from], |
| | iprt.ipRouteNextHop AS to, |
| | sn_to.value AS [name_to] |
| FROM | [ip.ipRouteTable] AS iprt, |
| | [system.sysName] AS sn_from, |
| | [system.sysName] AS sn_to |
| WHERE | sn_from.value = 'tribe.research.bell-labs.com' AND |
| | iprt.snmp_agent = sn_from.snmp_agent AND |
| | iprt.ipRouteNextHop = sn_to.snmp_agent; |

Find the immediate PREVIOUS HOPS of a given agent

| | |
|---|---|
| SELECT | iprt.snmp_agent AS [from], |
| | ipat.snmp_agent AS to |
| FROM | [ip.ipAddrTable] AS ipat, |
| | [ip.ipRouteTable] AS iprt |
| WHERE | ipat.snmp_agent = '135.104.46.1' AND |
| | ipat.ipAdEntAddr = iprt.ipRouteNextHop; |
| SELECT | iprt.snmp_agent AS [from], |
| | sn_from.value AS [name_from], |
| | ipat.snmp_agent AS to, |
| | sn_to.value AS [name_to] |
| FROM | [ip.ipAddrTable] AS ipat, |
| | [ip.ipRouteTable] AS iprt, |
| | [system.sysName] AS sn_from, |
| | [system.sysName] AS sn_to |
| WHERE | sn_to.value = 'tribe.research.bell-labs.com' AND |
| | ipat.ipAdEntAddr = iprt.ipRouteNextHop AND |
| | sn_to.snmp_agent = ipat.snmp_agent AND |
| | sn_from.snmp_agent = iprt.snmp_agent; |

When a user submits a query at a NM 101, the NM 101 receives the query, determine ENEs and ANMs required to answer the SQL query, usually parses the query, optimizes the query and generates a distributed query execution plan (QEP). The distributed QEP is then carried out on a distributed query execution engine. The distributed query execution engine involves the NM 101 and ANMs 103, 104 or network-enabled SNMP agents (which exposes an ANM interface). Basically, the execution engine at the NM 101 sends subqueries to involved ANMs 103, 104, gets back subqueries results, and recomposes the final query result. Note that multiple rounds between a NM 101 and ANMs 103, 104, and between ANMs 103 and 104 may be necessary to get a complex query answered.

Further, note that network 100 base tables are essentially horizontally partitioned among ANMs 103 and 104. Each ANM 103, 104 is responsible for a set of SNMP agents. Ideally, each SNMP agent becomes network 100 enabled, and works as an ANM for itself. Such SNMP agents are intelligent agents with the capability of carrying out relational queries. However, with legacy systems, network 100 will most likely still run on a many-snmp-agents-per-ANM basis.

The user interface of an ANM 103, 104 should enable administrators to configure the set of SNMP agents that ANM 103, 104 is responsible for. This function should preferably be able to be done dynamically. However, since there is no way to automatically locate SNMP agents, this configuration function has to be done manually.

In assigning SNMP agents to ANMs 103, 104, an administrator should be very careful to cover all SNMP agents of interest. Overlapping is allowed, and the network 100 will automatically pick one ANM among several ANMs representing a same SNMP agent. In addition, the administrator should assign an SNMP agent to the closest ANM to reduce total network traffic (and benefit from the network 100).

The configuration of a NM 101 could also be done manually, e.g., let the administrator compile a list of IP addresses of ANMs. A better option is to use a network plug-and-play system such as Jini to make the process both automatic and dynamic, i.e., when new ANMs 103, 104 come and go, the NM 101 automatically discovers them, and updates its list of ANMs.

The limitation of an automatic and dynamic configuration of ANMs 103, 104 is that the it is not easy for an administrator to control the set of SNMP agents in a network management domain. With Jini, it's possible to do lookup (for ANM services) using a certain policy, such as based on location. However, there are too many possible policies, and it is extremely difficult or impossible to implement all of them.

The current network 100 uses the following policy: an ANM will multicast lookup discovery requests to the standard Jini-specified IP address (224.0.1.85) and port (4160); the TTL can be set to limit the area of discovery: a value of one (1) will limit discovery to the local LAN segment, and a value below 64 (in the United States) will usually limit discovery in a company site. An ANM 103, 104 will register itself with all Jini lookup services it discovers. When a NM 101 starts up, a Jini lookup service discovery wizard will guide the user through the process of finding an available Jini lookup service. Generally a multicast discovery is sufficient. The NM 101 will form a network 100 management domain from all ANMs 103, 104 registered to that Jini lookup service (chosen by the user).

The arguments for such a policy are: a) it's simple and easy to understand; b) it's very automatic and (potentially) dynamic; c) most importantly, since it's easy to filter SNMP agents using SQL's WHERE clause, we want to include as many SNMP agents as possible in a network 100. However, under such a policy a user presently has less control over the forming of a network 100 management domain.

Another possibility is that the user specifies a list of SNMP agents in a network 100 management domain, and the NM 101 attempts to locate one ANM 103, 104 for each SNMP agent by matching the SNMP agents information in an ANM 103, 104 registers with the Jini lookup service.

The above-described embodiments are, of course, merely illustrative of the principles of the invention. Indeed, numerous other methods or apparatus may be devised by those skilled in the art without departing from the spirit and scope of the invention.

What is claimed is:

1. A method for use with a network management unit to be used in a network management system including at least one enhanced network element to obtain query results the method comprising the steps of:

obtaining an inputted query that is a declarative language query;

determining a set of enhanced network elements required to answer said declarative language query;

computing a query execution plan for each determined enhanced network element;

employing a query optimizer to compute each of said query execution plans;

transmitting an associated computed query execution plan to each determined enhanced network element;

obtaining results of said query execution plans from said at least one determined enhanced network elements;

combining said obtained results to generate a query result; and displaying said query result;

in said at least one enhanced network element obtaining a query execution plan from said network management unit, a query that is the basis for said query execution plan being a declarative query language query;

translating said query execution plan into a sequence of network management calls that are simple network management protocol (SNMP) calls;

employing a SNMP wrapper to translate said declarative query language query to said SNMP calls;

executing said sequence of network management calls to obtain a corresponding sequence of query results and correlating said sequence of query results; and supplying said correlated query results as an output from said at least one enhanced network element to said network unit.

2. The method as defined in claim 1 wherein said step of executing includes a step of employing an evaluator to effect the execution of said query execution plan.

3. The method as defined in claim 1 wherein said declarative query language is a structured query language (SQL).

4. A method for use in a network management unit to be used in a network management system an auxiliary network manager to obtain query results from one or more network elements, the method comprising the steps of:

obtaining an inputted query that is a declarative language query;

determining a set of auxiliary network management units required to answer said declarative language query;

computing a query execution plan for each determined auxiliary network management unit;

employing a query optimizer to compute each of said query execution plans;

transmitting an associated computed query execution plan to each of said determined auxiliary network management units, if any;

obtaining results of said query execution plans from said determined auxiliary network management units, combining said obtained results to generate a query result; and displaying said query result;

in at least one auxiliary network management unit obtaining a query execution plan from said network management unit, a query that is the basis for said query execution plan being a declarative query language query;

translating said query execution plan into a sequence of network management calls that are simple network management protocol (SNMP) calls;

employing a SNMP wrapper to translate said declarative query language query to said SNMP calls sending said sequence of network management calls to one or more network elements;

obtaining results of said sequence of network management calls from said one or more network elements;

combining results of said sequence of network management calls to generate a result of said query execution plan; and supplying said query execution plan result to said network management unit.

5. The method as defined in claim 4 wherein said step of obtaining results includes a step of employing an evaluator to effect the execution of said query execution plan.

6. The method as defined in claim 4 wherein said step of obtaining results includes a step of employing an evaluator to effect the execution of said query execution plan.

7. A method for use in a network management system comprising the steps of:

obtaining an inputted query that is a declarative language query;

determining a set of enhanced network elements and/or a set of auxiliary network management units required to answer said declarative language query;

computing a query execution plan for each determined enhanced network element and each determined auxiliary network management unit, a query that is the basis for said query execution plan being a declarative query language query;

transmitting an associated computed query execution plan to each determined enhanced network element and to each of said determined auxiliary network management units;

obtaining a query execution plan from a network management unit, a query that is the basis for said query execution plan being a declarative query language query;

each of said determined enhanced network elements translating said query execution plan into a sequence of network management calls that are simple network management protocol (SNMP) calls, employing a SNMP wrapper to translate said declarative query language query to said SNMP calls,and executing said network management calls to obtain query results; and supplying said query results as an output from said enhanced network element;

each of said determined auxiliary network management units obtaining a query execution plan from a network management unit, a query that is the basis for said query execution plan being a declarative query language query, translating said query execution plan into a sequence of network management calls that are simple network management protocol (SNMP) calls, employing a SNMP wrapper to translate said declarative query language query to said SNMP calls, sending said network management calls to one or more network elements, obtaining results of said network management calls from said one or more network elements, combining results of said network management calls to generate a result of said query execution plan, and supplying said query execution result to said network management unit;

combining said obtained results of said query execution plan from said determined enhanced network elements and said determined auxiliary network management units to generate a query result; and displaying said query result.

8. The method as defined in claim 7 wherein said declarative language query is a structured query language (SQL) query.

9. The method as defined in claim 7 wherein said declarative query language is a structured query language (SQL).

10. The method as defined in claim 9 wherein said step of translating includes a step of employing a SNMP wrapper for translating said SQL query to said SNMP calls.

11. The method as defined in claim 10 wherein said step of executing includes a step of employing an evaluator to effect the execution of said query execution plan.

12. Apparatus for use in a network management unit to be used in a network management system including at least one enhanced network element to obtain query results, the apparatus comprising:
- a first receiver for obtaining an inputted query said query being a declarative language query;
- a determination unit for determining a set of enhanced network elements required to answer said declarative language query;
- a query optimizer for computing a query execution plan for said at least one determined enhanced network element;
- a transmitter for transmitting an associated computed query execution plan to said at least one determined enhanced network element;
- a second receiver for obtaining results of said query execution plans from said determined enhanced network elements;
- a combiner for combining said obtained results to generate a query result; and
- a display for displaying said query result;
- in said at least one enhanced network element;
- a receiver for obtaining a query execution plan from a said network management unit, a query that is the basis for said query execution plan being a declarative query language query;
- a translator for translating said query execution plan into a sequence of network management calls that are simple network management protocol (SNMP) calls, said translator employing a SNMP wrapper to translate said declarative query language query to said sequence of SNMP calls;
- an evaluator for executing said network management calls to obtain query results and for correlating said query results; and
- a transmitter for supplying said correlated query results as an output from said at least one enhanced network element to said network management unit.

13. Apparatus for use in a network management unit to be used in a network management system including at least one auxiliary network manager to obtain query results from one or more network elements, the apparatus comprising:
- a first receiver for obtaining an inputted query, said query being a declarative language query;
- a determination unit for determining a set of auxiliary management units required to answer said declarative language query;
- a query optimizer for computing a query execution plan for said at least one determined auxiliary management unit;
- a transmitter for transmitting an associated computed query execution plan to said at least one determined auxiliary management unit;
- a second receiver for obtaining results of said query execution plans from said determined auxiliary management units;
- a combiner for combining said obtained results to generate a query result; and
- a display for displaying said query result;
- in said at least one auxiliary management unit;
- a first receiver for obtaining a query execution plan from said network management unit, a query that is the basis for said query execution plan is a declarative query language query;
- a translator for translating said query execution plan into a sequence of network management calls that are simple network management protocol (SNMP) calls, said translator including a SNMP wrapper for translating said declarative query language query to said sequence of SNMP calls;
- a first transmitter for sending said sequence of network management calls to one or more network elements;
- a second receiver obtaining results of said network management calls from said one or more network elements;
- a combiner for combining results of said network management calls to generate a result of said query execution plan; and
- a second transmitter for supplying said query execution result to said network management unit.

14. The apparatus as defined in claim 13 wherein said declarative query language is a structured query language (SQL).

15. Apparatus for use in a network management system comprising:
- a first receiver for obtaining an inputted query that is a declarative language query;
- a determination unit for determining a set of enhanced network elements and/or a set of auxiliary network management units required to answer said declarative language query;
- a query optimizer for computing a query execution plan for each determined enhanced network element and each determined auxiliary network management unit, a query that is the basis for said query execution plan being a declarative query language query;
- a first transmitter for transmitting an associated computed query execution plan to each determined enhanced network element and to each of said determined auxiliary network management units;
- a second receiver for obtaining a query execution plan from a network management unit, a query that is the basis for said query execution plan being a declarative query language query;
- each of said determined enhanced network elements including
  - a first translator for translating said query execution plan into a sequence of network management calls that are simple network management protocol (SNMP) calls, said translator including a SNMP wrapper to translate said declarative query language query to said SNMP calls, and
  - a first evaluator for executing said network management calls to obtain query results; and
  - a second transmitter for supplying said query results as an output from said enhanced network element;

each of said determined auxiliary network management units including
- a third receiver for obtaining a query execution plan from a network management unit, a query that is the basis for said query execution plan being a declarative query language query,
- a second translator for translating said query execution plan into a sequence of network management calls that are simple network management protocol (SNMP) calls and including a SNMP wrapper to translate said declarative query language query to said SNMP calls,
- a third transmitter for sending said network management calls to one or more network elements,
- a fourth receiver for obtaining results of said network management calls from said one or more network elements,
- a first combiner for combining results of said network management calls to generate a result of said query execution plan, and
- a fourth transmitter for supplying said query execution result to said network management unit;

a second combiner for combining said obtained results of said query execution plan from said determined enhanced network elements and said determined auxiliary network management units to generate a query result; and a display for displaying said query result.

16. The apparatus as defined in claim 15 wherein said declarative language query is a structured query language (SQL) query.

17. The apparatus as defined in claim 15 wherein said declarative query language is a structured query language (SQL).

18. The apparatus as defined in claim 17 wherein said step of translating includes a step of employing a SNMP wrapper for translating said SQL query to said SNMP calls.

* * * * *